Inventor
Rector R. Fergason

United States Patent Office 3,380,233
Patented Apr. 30, 1968

3,380,233
PLANT DIVIDER FOR HARVESTERS
Rector C. Ferguson, La Porte, Ind., assignor to Allis-Chalmers Manufacturing Company, Milwaukee, Wis.
Filed May 17, 1965, Ser. No. 456,399
10 Claims. (Cl. 56—119)

ABSTRACT OF THE DISCLOSURE

A row crop divider including interconnected linkage which provides a plant lifting and crop directing function efficient on level and hilled ground.

---

This invention relates to plant dividers for row crop harvesting machines.

Specifically, this invention relates to plant lifting and directing devices for row crow harvesters such as cotton or corn harvesters.

The principal object of this invention is to provide an improved plant and material lifting and guiding device for row crop harvesters which is responsive to ground conditions.

Another object of this invention is to provide a pivotally mounted divider point adapted to follow the irregularities occurring along rows of plants wherein the ground may be relatively horizontal or may be irregular due to hilling the plants or due to abnormal ground conditions.

Another object of this invention is to provide a divider point which is self-adjusting to row crops whether in a flat or ridged bed and constitutes a floating point which is responsive to ground conditions and wherein springs or the like are not utilized to maintain the point in a neutral position and which point is rugged for competing with the condition it will encounter.

These and other objects and advantages of the invention will become more apparent from the specification and drawings wherein.

Figure 2:
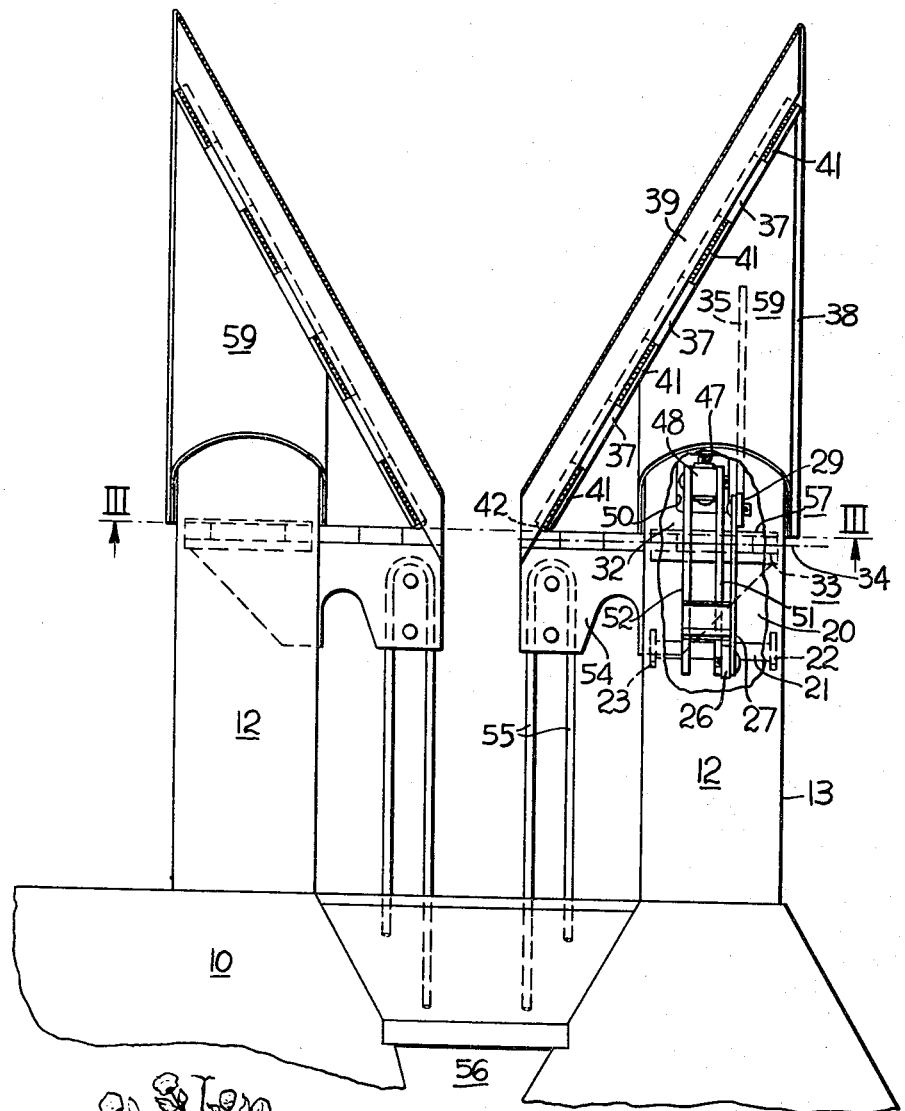
FIG. 2 is a plan view of the embodiment shown in FIG. 1 with some parts removed.

The portion 10 of a cotton picking unit shown in FIG. 2 is of conventional construction such as shown in U.S. Patent 2,691,265 and which portion is adjustable as to height relative to the ground and wherein runner 11 carried by the unit 10 rides on the ground when the unit is in operating position.

Figure 5:
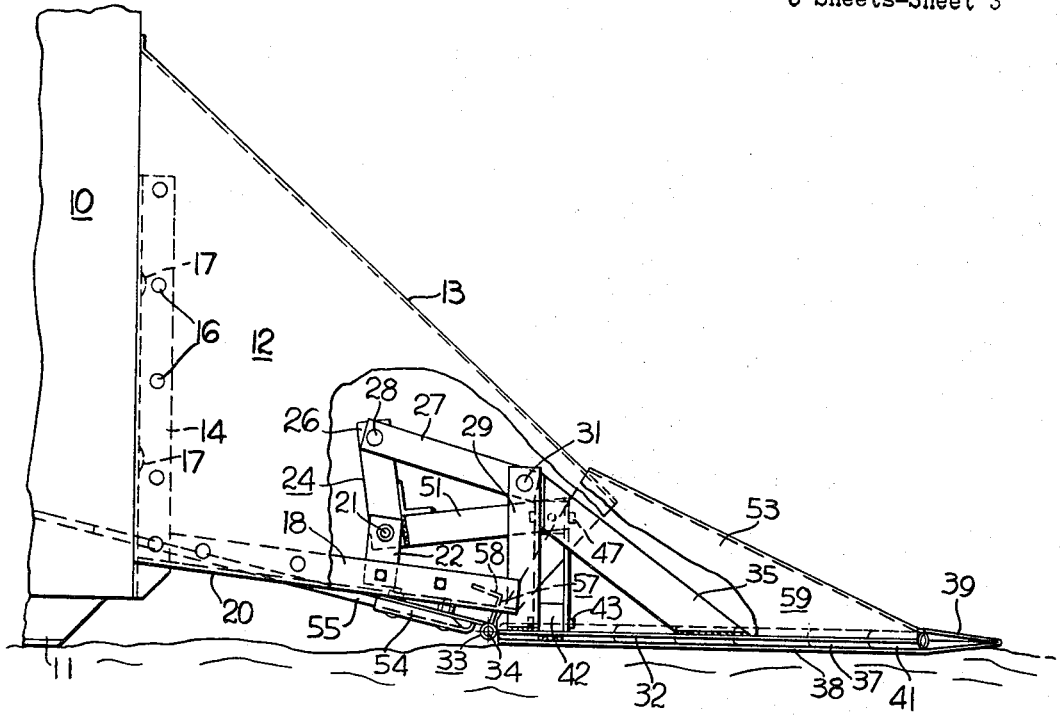
FIG. 5 is a side elevation of the divider when operating on unhilled plants.
Figure 6:
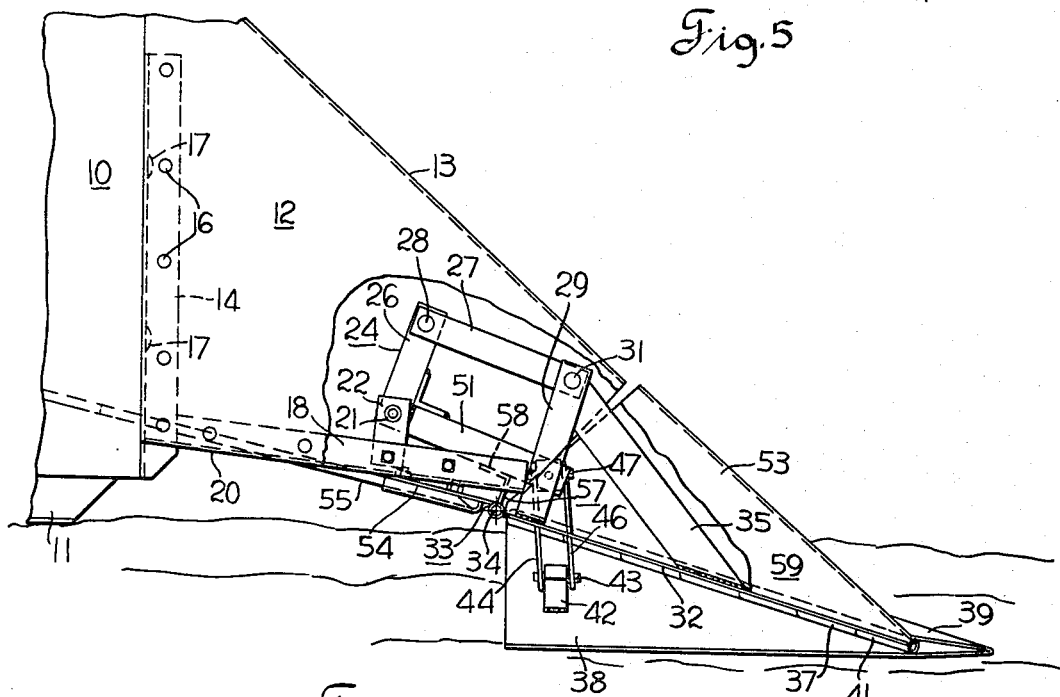
FIG. 6 is a side elevation of the divider when operating on hilled plants.

Referring to FIGS. 5 and 6, a crop divider 12 is shown as attached to a cotton picking machine 10. This divider can be used with other row crop harvesting machines such as corn harvesters. Divider 12 is attached to the forward end of cotton picking unit 10 for up and down movement therewith. The dividers include a first cover member or shield 13 having a generally inverted U-shaped cross-sectional configuration. The rear portion of this cover member is attached to the forward end of picking unit 10. The dividers are mounted on the forward end of the picking unit in pairs transversely spaced apart to define a passage through which cotton plants pass as the harvester moves through a field. In the following description only one divider will be described as the other divider of the pair is identical except for being a right hand or left hand divider.

Referring to FIG. 5, transversely spaced apart vertically extending angle irons 14 are attached to rear portions of first cover member 13 by means of bolts 16 and angle members 14 are attached to unit 10 by means of bolts 17. A pair of transversely spaced apart forwardly extending angle irons 18 and 19 are attached at their rear end to angle irons 14 and to lower portions of cover member 13 by suitable fastening means. A floor member 20 is attached to angle irons 18 and 19 by conventional means.

Figure 1:
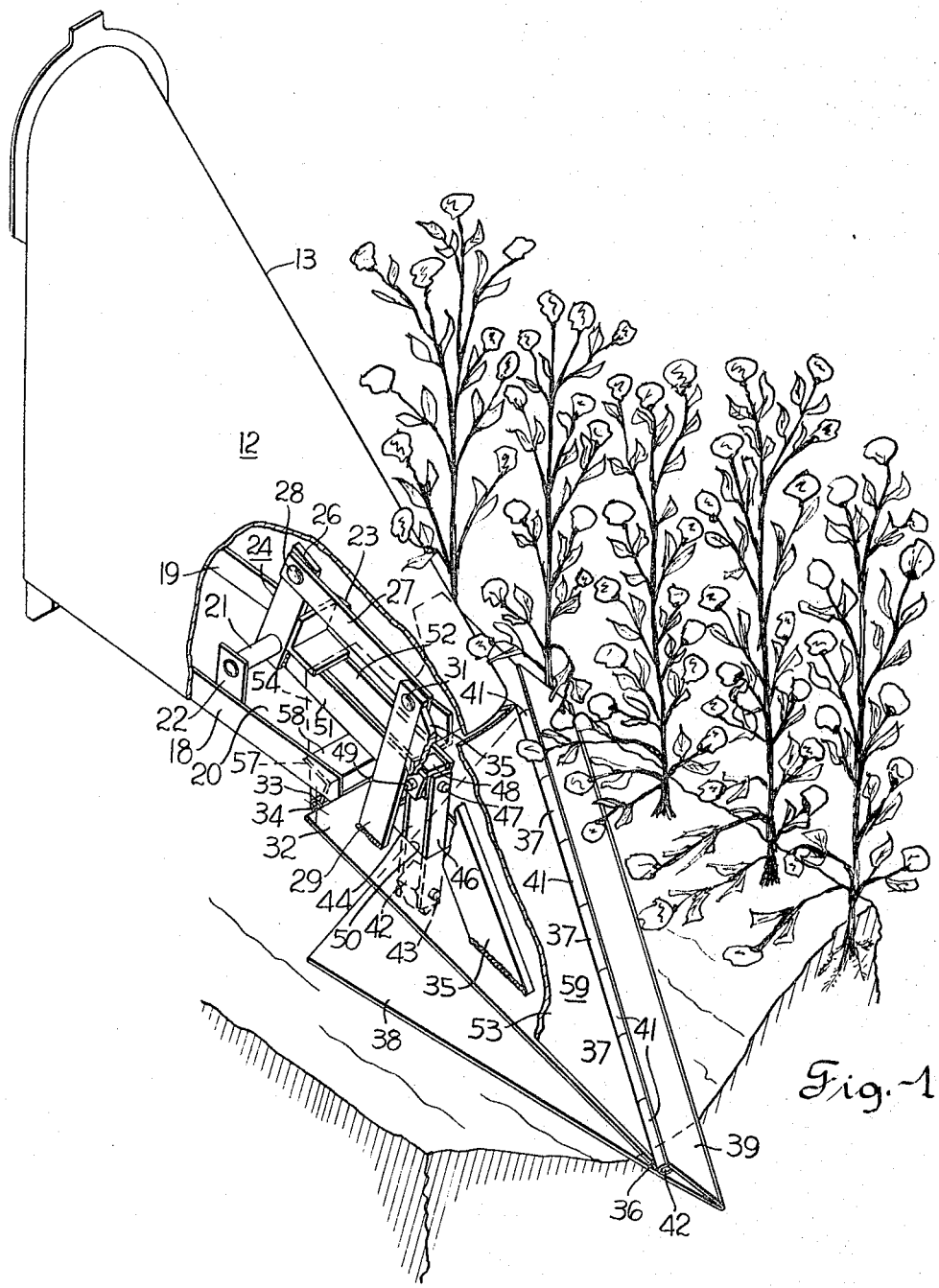
FIG. 1 is a perspective view of an embodiment of this invention with a portion of the upper and lower shields broken away for purposes of clarity.

Referring to FIG. 1, a pivot pin 21 is pivotally received in upstanding ears 22 and 23 which are attached at their lower ends to angle irons 18 and 19, respectively. A bell crank 24 having a generally vertically extending arm 26 is attached to pivot pin 21 for movement therewith. Arm 26 is provided with a pivotal connection at its distal end with one end of a longitudinally extending link 27 by means of a pivot pin 28. The other end of link 27 is pivotally connected to the upper end of a strap 29 by means of a pivot pin 31. The lower end of strap 29 is attached to a longitudinally extending plate member 32 as by welding. The rearward end of plate 32 is hingedly connected to the forward ends of angle irons 18 and 19 and floor 20 by means of a hinge assembly 33 which provides pivotal movement of plate 32 about the transverse axis 34 of hinge assembly 33. Strap 29 is reinforced by a slanting member 35 attached at its upper end to strap 29 and at its lower end to plate 32.

Plate 32 is triangularly shaped and extends forwardly to an apex 36. One side of plate 32 is provided with a series of spaced apart hinge portions 37 from which a depending shoe member 38 is hingedly connected. This hinge connection extends from apex 36 rearwardly to hinge connection 33. Depending shoe member 38 has one longitudinal side 39 turned over and a series of hinge portions 41 are attached to member 38 and turned over portion 39 as by welding. Hinged portions 41 are spaced apart to be received within the spacings between hinge sections 37 and both series are interconnected by a hinge pin 42 passing therethrough.

Depending shoe portion 38 is provided with a bracket 42 which receives a longitudinally extending pivot pin 43. A pair of longitudinally spaced vertically extending links 44 and 46 are pivotally connected at one end of each thereof to pivot pin 43. The other ends of links 44 and 46 are pivotally connected to a pivot pin 47 carried by a block 48 supported by a transverse pivot pin 49 received in the forward ends of a pair of transversely spaced longitudinally extending arms 51 and 52 of bell crank 24. Links 44 and 46 pass through an opening 50 in plate 32.

A second cover portion or shield 53 formed generally as a portion of a cone is attached by conventional means to plate 32 for movement therewith. Hinge assembly 33 (FIG. 2) includes a plate 54 with tines 55 attached thereto for directing crop material into tunnel 56 and for permitting stones and trash to drop onto the ground. Tines 55 do not move except with plate 54. Hinge assembly 33 also includes a transversely extending angle iron 57 one leg 58 of which (FIG. 1) forms a stop for limiting the downward movement of arms 51 and 52 and thereby the downward movement of the forward or floating point portion 59 of divider 12. Upward movement of arms 51 and 52 is limited by shoe 38 contacting the underside of plate 32.

Shoe member 38, because it is pivotally mounted on an obliquely extending pivot 42, is very sensitive to changes in ground conditions. Any changes in the transverse aspect of shoe member 38 results in a raising or lowering of plate 32 through the bell crank linkage interconnecting plate 32 with shoe member 38 and thereby results in a raising or lowering of the entire floating point 59.

Figure 3:
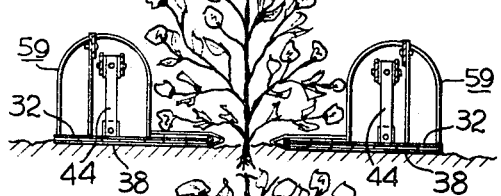
FIG. 3 is a view taken on line III—III of FIG. 2 showing the divider when operating on unhilled plants.
Figure 4:
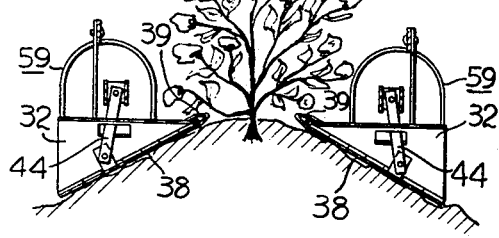
FIG. 4 is similar to FIG. 3 but showing the divider when operating on hilled plants.

The operation of the divider point is as follows:

When the unit 10 is lowered to operating position with unit shoe 11 riding on the ground, shoe member 38 adapts itself and the floating point 59 to the ground conditions as is illustrated in FIGS. 3, 4, 5, and 6. If the cotton plants are not hilled, shoe member 38 and the point 59 will be positioned as shown generally in FIGS. 3 and 5. Although these figures represent a limit position and shoe member 38 will under ordinary circumstances be somewhat separated from plate 32 as is shown in FIG. 1. If the cotton plants are hilled, shoe member 38 and the point will be positioned as shown in FIGS. 4 and 6 and for intermediate ground conditions, shoe member 38 and the point will be positioned somewhat intermediate the extreme positions shown in FIGS. 3 and 4. It should be noted, as shown in FIGS. 3 and 4, the inner portion 39 of shoe 38 provides a shell for fallen crop material which will be transmitted rearwardly to the picking unit by action of the plants being crowded against the point.

From the foregoing, it is seen that a row crop harvester divider has been provided which has sufficient flexibility so that it will efficiently handle row crop plants regardless of the ground condition and will direct plant material which may have fallen to the ground rearwardy between the dividers into the picking unit and thereby eliminating much loss.

It should also be noted that embodiments of this invention do not use any spring means for maintaining the points in a normal position. The points of this invention stay down on the ground and do not tend to bounce in the manner of spring loaded points. In operation, the points shown and described tend to float on the ground, gently raising or lowering in response to ground conditions. The center of gravity of this floating point is forwardly of pivot axis 34 and accordingly such point tends to pivot clockwise about pivot axis 34 to the position shown in FIG. 6. The center of gravity of shoe 38 is adjacent to and forward of bracket 42 and accordingly shoe 38 tends to pivot counterclockwise about pivot axis 43 to the position shown in FIG. 6. Accordingly, a change in ground conditions automatically causes shoe 38 both to pivot about pin 43 and also causes plate 32 and the members attached thereto to pivot about axis 34. As a result, point 59 is continually changing its aspect relative to the units by such pivoting about axis 34 and pin 43 in response to ground conditions and thereby providing good efficiency in material pick up and material movement.

The embodiments of the invention for which an exclusive property or privilege is claimed are defined as follows:

1. A row crop divider for longitudinally extending rows of crop material and having a movable point portion for directing material laterally and rearwardly to a crop treating unit upon which said divider is attached for movement therewith, said movable point being pivotally mounted on the forward end of said divider for movement about a transverse axis, said point including a bottom member connected thereto for pivotal movement therewith, said bottom member including a forward inner side extending obliquely to said longitudinally extending row of crop material for directing said row of crop rearwardly and transversely inwardly to said crop treating unit, the improvement comprising a shoe member pivotally connected to said bottom member for pivotal movement about said inner side and about an oblique axis and including a first portion and a second portion on opposite sides of said pivotal connection, a bell crank attached to said divider for movement about a transverse axis, said bell crank having one arm pivotally connected to said bottom member and having another arm universally connected to said first portion of said shoe member through an opening in said bottom member thereby providing an interconnected linkage between said point and said divider wherein pivotal movement of said shoe about said oblique axis results in pivotal movement of said point about said transverse axis.

2. A row crop divider as set forth in claim 1 and wherein said second portion extends inwardly from said oblique axis providing a shelf for material to be moved from said point to said unit.

3. A row crop divider as set forth in claim 2 and wherein said first portion of said shoe being configured substantially the same as said bottom member so that when said shoe is horizontally positioned relative to said oblique pivot said other portion will lie directly beneath said bottom member and be coextensive therewith.

4. A row crop divider as set forth in claim 2 and wherein stop means are carried by said point and said divider, respectively, for limiting the raising and lowering movement of said point and the pivotal movement of said shoe.

5. A row crop divider as set forth in claim 1 and wherein said divider being provided with tines rigidly attached thereto for directing material moved over said second portion to said unit.

6. A row crop divider as set forth in claim 1 and wherein said first portion having a greater mass than said second portion and thereby normally acting to move said shoe away from said bottom member and to lower said point through said interconnected linkage.

7. A row crop divider for longitudinally extending rows of crop material and having a movable point for directing crop material laterally and rearwardly to a crop harvesting unit, said divider being mounted on said unit and having a floating point pivotally mounted on the forward end thereof for movement about a transverse axis, said point having a forward inner side extending obliquely to one side of said row of crop material for directing same rearwardly and transversely inwardly to said unit, the improvement comprising a ground engaging shoe pivotally connected to said obliquely extending side for movement about an axis extending parallel to said obliquely extending side, and interconnecting linkage means operatively interposed between said divider and said point for vertically positioning said point about said transverse axis in response to movement of said shoe about said oblique axis, said ground engaging shoe being positioned in underlying relation to said point and being substantially coextensive therewith.

8. A row crop divider as set forth in claim 7 and wherein said ground engaging shoe comprises two portions, one of said portions generally underlying said point to one side of said oblique pivot and the other portion lying on the other side of said pivot to provide a crop pick up and guiding portion for directing material to said unit.

9. A row crop divider as set forth in claim 8 and wherein said divider is provided with tines forming a rearward extension of said one portion and wherein said other portion moves relative to said tines.

10. A row crop divider as set forth in claim 8 and wherein said one portion has a mass greater than said other portion and thereby normally acting to pivot said one portion downwardly about said oblique axis away from said point and to lower said point through said interconnected linkage means.

References Cited

UNITED STATES PATENTS

| | | | |
|---|---|---|---|
| 1,852,702 | 4/1932 | Coultas et al. | 56—119 |
| 3,307,338 | 3/1967 | Mizzi | 56—16 |

ABRAHAM G. STONE, *Primary Examiner.*

P. A. RAZZANO, *Assistant Examiner.*